US012716869B2

(12) United States Patent
Shang et al.

(10) Patent No.: US 12,716,869 B2
(45) Date of Patent: Aug. 25, 2026

(54) METHOD AND DEVICE OF IDENTIFYING AND LOCATING PCCP BROKEN WIRE SIGNAL

(71) Applicant: CHINA INSTITUTE OF WATER RESOURCES AND HYDROPOWER RESEARCH, Beijing (CN)

(72) Inventors: Feng Shang, Beijing (CN); Yue Zhang, Beijing (CN); Xuhui Yu, Beijing (CN); Haonan Wei, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 387 days.

(21) Appl. No.: 18/420,940

(22) Filed: Jan. 24, 2024

(65) Prior Publication Data

US 2025/0102466 A1 Mar. 27, 2025

(30) Foreign Application Priority Data

Sep. 27, 2023 (CN) ........................ 202311266897.8

(51) Int. Cl.
*G01N 29/04* (2006.01)
*G01N 29/44* (2006.01)

(52) U.S. Cl.
CPC ............ *G01N 29/04* (2013.01); *G01N 29/44* (2013.01); *G01N 2291/023* (2013.01)

(58) Field of Classification Search
CPC .. G01N 29/04; G01N 29/44; G01N 2291/023; G01N 29/2418; G01N 29/07; G01N 29/4454; G01N 2291/011; G01N 2291/0289; G01N 2291/262; G01D 5/35325; G01D 5/35361; G01H 9/004
See application file for complete search history.

(56) References Cited

U.S. PATENT DOCUMENTS 4,265,122 A * 5/1981 Cook .................. G01S 7/52036 73/644
2024/0377242 A1* 11/2024 Itsubo .................... G01H 9/004

FOREIGN PATENT DOCUMENTS

CN 107589180 A * 1/2018

* cited by examiner

*Primary Examiner* — Tarun Sinha
(74) *Attorney, Agent, or Firm* — HAUPTMAN HAM, LLP

(57) ABSTRACT

The present invention relates to a method and a device of identifying and locating a PCCP broken wire signal, the device comprises a distributed optical cable adheres on a pipe, a high frequency subsystem connected with two cores of the cable, a low frequency subsystem connected with the third core of the cable, and a control system which is connect to the two subsystems, the device is configured to analyze abnormal vibration signal compared with the database of the broken wire signal database and determine whether a broken wire event occurs. In addition, it is also configured to analyze low frequency abnormal vibration signals through two neighbor channels to locate the wire breakage. The present invention can identify and locate the broken wire event with high accuracy.

15 Claims, 4 Drawing Sheets

METHOD AND DEVICE OF IDENTIFYING AND LOCATING PCCP BROKEN WIRE SIGNAL

RELATED APPLICATIONS

The present application claims priority from Chinese Application Number 202311266897.8 filed Sep. 27, 2023, the disclosure of which is hereby incorporated by reference herein in its entirety.

FIELD OF THE INVENTION

The present invention relates to the field of structural safety monitoring, in particular relates to a method and a device of identifying and locating a PCCP broken wire signal based on acoustic fiber optic monitoring field.

BACKGROUND OF THE INVENTION

Pre-stressed Concrete Cylinder Pipe (abbreviated as PCCP) is a composite pipe, usually consists of the following structure: a high-strength concrete core embedded with a thin steel cylinder, a externally wrapped pre-stressing steel wire, and a mortar coating layer. PCCP uses fully the respective advantages of compression resistance of the concrete, tensile resistance of the steel wire, permeability resistance of the steel cylinder, etc., such that the pipe is provided with characteristics of high permeability resistance, high tightness and high strength, and is commonly used for municipal engineering project, such as water supply projects, energy projects and other projects. The pre-stressing steel wire could be broken during the manufacture, construction and service stages of PCCP projects due to a variety of reasons. With the increase of the number of broken wire, the bearing capacity of the pipe gradually decreases, and in serious cases, pipe bursting accidents may even occur. Compared with the method using individual sensors in equal spacing, distributed optical fiber monitoring method could be a more accurate and relatively cost-saving choice to collect the acoustic signals induced by the wire breakage along a long distance pipeline.

Acoustic fiber optic monitoring technology is used to assess the structural condition of PCCP in prior art. According to acoustic fiber optic monitoring technology, fiber optic sensors enable real-time monitoring of PCCP wire broken event. Specifically, a optical cable is suspended and mounted inside a pipe, One core of the optical cable is connected to a interferometer, which is used as detection arm to detect an broken wire signal based on an acoustic wave transmission medium, and the reference arm is generally placed outside a pipe. Another core of the optical cable is connected to a laser which is independent from the interferometer. And the backward relay scattering light in the optical fiber is directly accessed to a signal collection system, to locate the broken wire signal; the main solution of the prior provides a method of identifying broken wire signal based on the accessment of whether the energy of signal in certain frequency range exceeds a preset threshold.

There are some technical problems to be solved for distributed fiber optic monitoring to detect wire breakage in PCCP used in prior technology: (1) as an acoustic optical fiber is hanged inside a pipe and water is used as an acoustic wave transmission medium, monitoring can only be implemented in a water-filling condition of the pipe, and monitoring cannot be implemented in an empty condition of the pipe; (2) there could be less accurate result by placing a reference arm outside a pipe in vibration-isolated environment, and the accuracy of signal identification is low as water flow sound environment within the pipe is complex; (3) because a backward relay scattering light is directly collected to an data acquisition system, the signal location accuracy is poor due to the follow problems: signal repetition frequency is low, a full length of scanning is only 100 Hz under 20 km condition; (4) because the main solution method of prior technology is to provide a method of identifying broken wire signal based on the asscessment of whether the energy of signal in certain frequency range exceeds a preset threshold, manual calibration assistance is required and it is easy to be interfered by other abnormal signal, it is difficult to achieve a real-time alarm of a broken wire signal.

BRIEF DESCRIPTION OF THE INVENTION

In response to the above problem, the present invention provides a method and a device of identifying and locating PCCP broken wire signal, which can identify and locate a broken wire event with high accuracy, realize safety risk timely, and this present invention can be operated in a long-distance PCCP project.

In order to realize the above object of the invention, the present invention adopts the following technical solution:

In a first aspect, the present invention provides a method of identifying and locating a PCCP broken wire signal, the method comprises:

- placing a distributed optical cable on a pipe by adhesive, wherein two cores of the distributed optical cable are collected to a high frequency subsystem, and a third core of the distributed optical cable is collected to a low frequency subsystem;
- collecting a broken wire vibration high frequency signal by the high frequency subsystem through the distributed optical cable placed inside the pipe based on an interference system, and collecting a broken wire vibration low frequency signal by the low frequency subsystem through the distributed optical fiber based on backward relay scattering light interference;
- performing abnormal vibration signal analysis based on the broken wire vibration high frequency signal to determine whether a broken wire event occurs;
- determining a time period of an abnormal vibration signal occurrence when it is determined that the broken wire event occurs;
- processing the broken wire vibration low frequency signal corresponding to the time period of the abnormal vibration signal occurrence, and determining a location where the broken wire signal occurs based on a fluctuation propagation.

Further, performing abnormal vibration signal determination on the broken wire vibration high frequency signal to determine whether a broken wire event occurs comprises:

- Performing a real-time window function to truncation signal, filtering, and time-frequency analysis on the collected broken wire vibration high frequency signal;
- Extracting a statistical characteristic parameters of time domain, frequency domain and time-frequency domain of the broken wire vibration high frequency signal;
- Comparing the extracted statistical characteristic parameter with a pre-set broken wire signal database, calculating a matching probability density of a segment of signal and the database, and when a calculation result of the probability density exceeds a preset threshold, automatically identify the segment of signal as a broken wire signal and determine that the broken wire event occurs.

Further, determining a location where the broken wire signal occurs by processing the broken wire vibration low frequency signal corresponding to the time period of the abnormal vibration signal occurrence, comprises:

perform a time-length plus-window truncation on the collected broken wire vibration low frequency signal;

filter the broken wire vibration low frequency signal corresponding to the time period of abnormal vibration signal occurrence during which the broken wire event occurrence is determined;

compare each sample channel data within the time period and the preset broken wire signal database, calculate the matching probability density of each sample channel signal data and the preset broken wire signal database, and when a probability density calculation result of a sample channel signal data exceeds a preset threshold, save the sample channel signal data, and delete the other channels data;

analyze saved location relationship of several sample channels, determine adjacent several sample channels where the broken wire signal occurs based on a fluctuation propagation law, and calculate a broken wire location based on a wave speed.

Further, when it is determined that the broken wire vibration low frequency signal arrives backwardly at two adjacent sample channels, determine that a broken wire occurs between the two adjacent sample channels, determine a time difference between the two moments when the broken wire vibration signal arrives at the two adjacent sample channels, and determine the broken wire location according to the following equation:

$$x_1 = (d - vt)/2 \text{ or } x_2 = (d + vt)/2,$$

wherein x_1 is a distance from the broken wire location to a first sample channel, x_2 is a distance from the broken wire location to a second sample channel, tis a time difference between the two moments when the broken wire vibration low frequency signal arrives at the two adjacent sample channels, respectively, d is a space between the two adjacent sample channels, and v is a wave speed of the broken wire vibration low frequency signal propagating in the pipe.

Further, an accumulating method of the broken wire signals database, comprises:

calculate a matching probability density of the sample signal and the broken wire signal database, and when a probability density calculation result is less than a preset threshold, mark the sample signal as other signal and save in the broken wire signal database;

When the probability density calculation result of the sample signal exceeds the preset threshold and a real broken wire event is verified, mark the sample signal as a broken wire signal and save in the broken wire signal database, otherwise mark the sample signal as other signal and save in the broken wire signal database.

In a second aspect, the present invention provides a locating device for realizing the described method of identifying and locating a PCCP broken wire signal, the device comprises:

a distributed optical fiber, which adheres to a pipe longitudinally;

a high frequency subsystem configured to connect the two cores of the distributed optical fiber, to acquire a broken wire vibration high frequency signal based on an interference system through the distributed optical fiber arranged inside the pipe;

a low frequency subsystem configured to connect a third core of the distributed optical fiber, to acquire a broken wire vibration low frequency signal through the distributed optical fiber based on backward relay scattering light interference;

a control system configured to carry out an abnormal vibration signal determination on the broken wire vibration high frequency signal to determine whether a broken wire event occurs, determine a time period of the abnormal vibration signal occurrence when the broken wire event is determined to occur, process the broken wire vibration low frequency signal of the channel corresponding to the time period of the abnormal vibration signal occurrence, and determine the location of the broken wire signal occurrence based on a fluctuation propagation law, wherein the high frequency subsystem and the low frequency subsystem acquire data synchronously.

Further, the distributed optical fiber is fixed to the inner wall of the pipe or the outer wall of the pipe by adhesive through gel material, a solid is used as a main acoustic transmission medium.

Further, the distributed optical fiber extends out of the pipe through a gate valve wellhead by a special seal; and the outer surface of the gel material is coated with waterproof material to provide durability protection.

Further, the high frequency subsystem comprises a laser, an isolator, a first coupler, a reflector, a first photo detector, and a first acquisition system, the distributed optical fiber comprises two cores, wherein one of the two cores is used as a reference arm optical fiber, another one of the two cores is used as a measurement arm optical fiber, and the reference arm optical fiber and the measurement arm optical fiber are both provided on the inner wall of the pipe;

a laser light emitted from the laser is launched to the first coupler through the isolator via a transmission optical fiber, and is divided into two beams of light which are sent respectively to the reference arm optical fiber and the measurement arm optical fiber, to acquire the vibration high frequency signal in the pipe; the reflectors are provided at the ends of the reference arm optical fiber and measurement arm optical fiber, a reference light and a measurement light are reflected back to the first coupler for interfere via the reflector corresponded; an light interfered is detected by the first photo detector and converted into a voltage signal, which is collected by the acquisition system; when the environmental vibration results in an optical path difference between the measurement arm optical fiber and the reference arm optical fiber, it is reported by a time domain change of an optical phase interfered.

Further, the low frequency subsystem comprises a laser, a second coupler, a pulse generator, an acousto-optic modulator, an Erbium-doped optical fiber amplifier, a circulator, a third coupler, a second photo detector, and a second acquisition system; the third core of the distributed optical fiber is used as a sensing optical fiber;

a laser light emitted from the laser is launched to the sensing optical fiber through the second coupler, the pulse generator, the acousto-optic modulator, the erbium-doped optical fiber amplifier and the circulator connected by a transmission optical fiber sequentially, at the same time a part of the light is divided by the second coupler to be used as a reference light, the reference light interferes with the backward relay scattering light in a sensing light path in the third coupler, an interfered light intensity is detected by the second photo detector to sense vibration information on the sensing optical fiber, and the optical signal detected by the second photo detector is collected by the second acquisition system, the pulse generator is used to connect to the acousto-optic modulator, and the acousto-optic modulator is configured to modulate continuous light emitted by the laser into a pulsed signal.

The present invention provides the following characteristics:

1. The present invention places the distributed optical fiber to the pipe by using a adhesive gel. The optical fiber can be placed on inner wall of the pipe or the outer wall of the pipe. The optical fiber uses a solid as the main sound transmission medium, so that not only the broken wire monitoring can be implemented in the water-filling operation condition of the pipe, but also can be implemented in the emptying condition of the pipe.
2. The present invention uses a combination of high frequency and low frequency interference subsystems based on two different principles to collect synchronously vibration signals propagating on the pipe wall of the PCCP, in which the broken wire high frequency signal is collected based on the Michelson interference principle, and two cores in the distributed optical fiber mounted on the inner wall of the pipe are used as the interfering arm and the reference arm respectively to form a first interferometer, which identifies the broken wire signal based on the interference result, and such processing is conducive to suppressing common mode noise, and the identification accuracy of the pulse signal is high; the third core of the distributed optical fiber mounted on the pipe wall is connected to the second laser which is independent of the first interferometer, and is coupled with the reference optical fiber accessed out of the second laser to form a second interferometer, which interferes the backward relay scattering light and the background light in the reference optical fiber; the broken wire signal is collected according to the interference results; such data processing methods is improving the accuracy of locating pulse signal.
3. In the present invention, the broken wire signal is located according to the fluctuation analysis method to realize a real-time monitoring of the broken wire signal.
4. In the present invention, the data processing workload of the low frequency subsystem is greatly reduced, and the impact of water flow noise interference in data processing is reduced.

In summary, the present invention can be widely used in PCCP broken wire signal monitoring.

BRIEF DESCRIPTION OF THE DRAWINGS

Various other advantages and benefits will become clear to those of ordinary skill in the art by reading the detailed description of the preferred embodiment below. The accompanying drawings are used solely for the purpose of illustrating the preferred embodiment and are not to be considered a limitation of the present invention. Throughout the accompanying drawings, the same parts are indicated by the same reference numbers. In the accompanying drawings:

FIG. 2 shows a schematic diagram of the method of identifying and localizing the PCCP broken wire signal of the embodiment of the present invention;

DETAILED DESCRIPTION OF THE INVENTION

Figures 1, 1A:
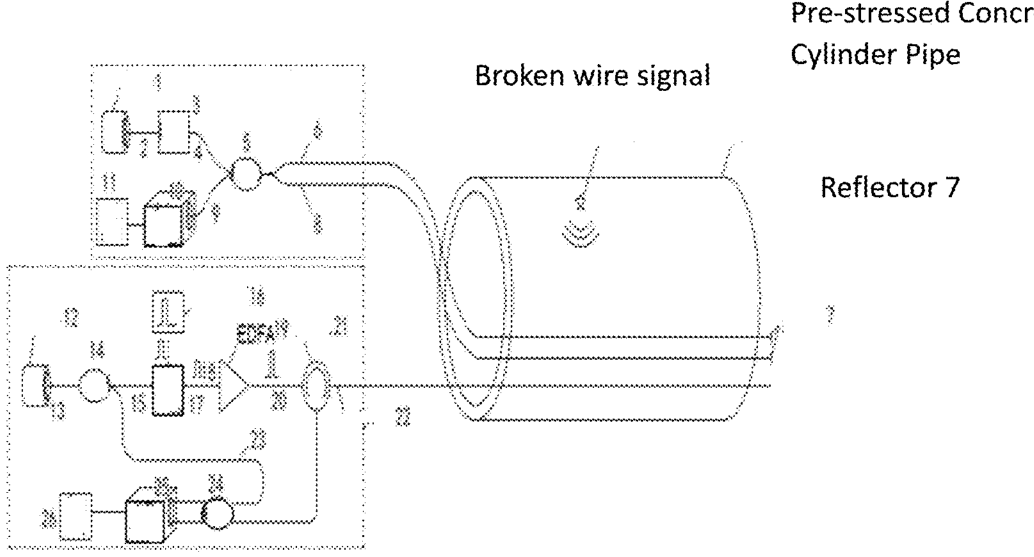
FIGS. 1A-1, 1A-2 and 1B shows a structural diagram of a PCCP acoustic optical fiber break monitoring system of an embodiment of the present invention.

It should be understood that the terms used in the text are used solely for the purpose of describing particular example embodiments and are not intended to be limiting. The singular forms "one," "a," and "the," as used in the text, may also be meant to include the plural forms unless the context clearly indicates otherwise. The terms "including", "comprising", "containing", and "having" are inclusive and thus specify the presence of the stated features, steps, operations, elements and/or components, but does not preclude the presence or addition of one or more other features, steps, operations, elements, components, and/or combinations thereof. The method steps, processes, and operations described in the text are not to be construed as necessarily requiring that they be performed in the particular order described or illustrated unless the order of performance is clearly indicated. It should also be understood that additional or alternative steps may be used.

Although the terms of first, second, third, etc., may be used in the text to describe a plurality of elements, components, regions, layers, and/or segments, which should not be limited by these terms. These terms may be used only to distinguish one element, component, region, layer or segment from another. Terms such as "first", "second", and other numerical terms are used in the text without implying order or sequence unless the context clearly indicates otherwise. Accordingly, the first element, component, region, layer, or segment discussed below may be referred to as a second element, component, region, layer, or segment without departing from the teachings of the example embodiments.

For ease of description, spatial relativity terms may be used in the text to describe the relationship of one element or feature to another element or feature as illustrated in the figures, such as "inside," "outside," "inside," "outside," "below," "above," and the like. This spatial relativity terminology is intended to include different orientations of the device in use or operation other than those depicted in the drawings.

Since the signal generated by prestressed broken wire belongs to short-term non-stationary random processes, signal frequency component is very complex and can vary with time. For the problems of the fiber optic monitoring system, such as high cost, difficulty of rapid and accurate identification and location of the broken wire event, etc., the present invention provides a method and a device of identifying and locating a PCCP broken wire signal based on adhesive acoustic fiber optic monitoring, comprises: provide a distributed optical fiber on a pipe by adhesive, two cores of the distributed optical fiber are accessed to a high frequency subsystem, and a third core of the distributed optical fiber is accessed to a low frequency subsystem; acquire a broken wire vibration high frequency signal by the high frequency subsystem through the distributed optical fiber arranged inside the pipe based on an interference system, and acquire a broken wire vibration low frequency signal by the low frequency subsystem through the distributed optical fiber based on backward relay scattering light interference; perform abnormal vibration signal determination on the broken wire vibration high frequency signal to determine whether a broken wire event occurs; determine a time period of an abnormal vibration signal occurrence when it is determined that the broken wire event occurs; process the broken wire vibration low frequency signal corresponding to the time period of the abnormal vibration signal occurrence, and determine a location where the broken wire signal occurs based on a fluctuation propagation law. Therefore, the present invention can identify and locate a broken wire event with high accuracy, and realize safety risk timely warning to a long-distance operating PCCP.

Exemplary embodiments of the present invention will be described in more detail below with reference to the accompanying drawings. Although exemplary embodiments of the present invention are shown in the accompanying drawings, it should be understood, however, that the present invention may be realized in various forms without being limited by the embodiments set forth herein. Rather, these embodiments are provided to enable a more thorough understanding of the present invention and to enable a complete communication of the scope of the invention to those skilled in the art.

Example 1: The present embodiment provides a device of identifying and locating PCCP broken wire signal, comprises:

- a distributed optical cable provided on the inner wall of the pipe or the outer wall of the pipe by adhesive along the longitudinal direction of the pipe;
- a high frequency subsystem, connecting two cores of the distributed optical fiber for acquiring a broken wire vibration high frequency signal;
- a low frequency subsystem, connecting the third core of the distributed optical fiber for acquiring a broken wire vibration low frequency signal;
- A control system, performing an abnormal vibration signal determination on the broken wire vibration high frequency signal to determine whether a broken wire event occurs; determining a time period of the abnormal vibration signal occurrence when the broken wire event is determined to occur; and processing the broken wire vibration low frequency signal of the channel corresponding to the time period of the abnormal vibration signal occurrence and determining the broken wire signal occurrence location based on a fluctuation propagation law; and also sending the abnormal vibration information to the engineering operation management and sending monitoring data of the relevant time period for early warning, wherein the high frequency subsystem and the low frequency subsystem acquire data synchronously.

In a preferred manner of the present embodiment, the distributed optical fiber may adopt a multi-core single-mode acoustic optical fiber, wherein two cores are used for connecting the high frequency subsystem, and other one core is used for connecting the low frequency subsystem.

Further, the distributed optical fiber is fixed to the inner wall of the pipe or the outer wall of the pipe by adhesive through gel material, and a solid is used as a main acoustic transmission medium. Wherein, when the distributed optical fiber is fixed to the inner wall of the pipe, the distributed optical fiber extends out of the pipe through a gate valve wellhead by a special seal; because the distributed optical fiber is fixed by adhesive, not only the broken wire monitoring can be implemented in the water-filling operation condition of the pipe, but also can be implemented in the emptying condition of the pipe.

Further, the distributed optical fiber is axially bonded to the pipe along the pipe, and the distributed optical fiber needs to be uniformly, closely, and continuously bonded to the pipe along the pipe. In practical application environments, the coupling effect between the distributed optical fiber and the pipe is a key factor affecting the accurate identification and location of the PCCP broken wire signal. Therefore, in the present embodiment, a gel material such as epoxy resin, cement etc., may be used to continuously bond the distributed optical fiber to the pipe along the longitudinal direction of the pipe, and a waterproof material may be coated on the outer surface of the gel material to provide durability protection.

In a preferred way of the present embodiment, the high frequency subsystem is based on the Michelson optical interference principle for distributed fiber optic monitoring, and the high frequency subsystem comprises a measurement arm and a reference arm of equal length, wherein one core of the distributed optical fiber mounted on the pipe wall can be used as the measurement arm optical fiber, and the other core can be used as the reference arm optical fiber, and both of the measurement arm optical fiber and the reference arm optical fiber are set on the inner wall of the pipe, so that when the environmental vibration results in an optical path difference between the measurement arm optical fiber and the reference arm optical fiber, it is reported by a time domain change of an optical phase interfered. Wherein, the sample frequency of the high frequency subsystem of the present embodiment can reach more than 100 kHz, completely covering the main frequency of the broken wire signal.

Further, as shown in FIGS. 1A-1, 1A-2 and 1B, the high frequency subsystem comprises a narrow line width laser 1, a first connecting optical fiber 2, an isolator 3, a second connecting optical fiber 4, a coupler 5, a reference arm optical fiber 6, a reflector 7, a measurement arm optical fiber 8, a third connecting optical fiber 9, a photoelectric detector 10, and a signal collection system 11.

Wherein, the narrow line width laser 1 emits and then launches laser light to the coupler 5 through the first connection optical fiber 2, the isolator 3, and the second connection optical fiber 4 in sequence, the laser light is divided into two beams of coherent light through the coupler 5 and is sent to the reference arm optical fiber 6 and the measurement arm optical fiber 8, respectively, and the reference arm optical fiber 6 and the measurement arm optical fiber 8 are used to acquire the environmental vibration signals in the pipe. A reflector 7 are mounted at the end of the measurement arm optical fiber 8 and the reference arm optical fiber 6 to reflect back to the coupler 5 for interference, and the light intensity of the two laser beams after coherence is detected by the photo detector 10 and is converted into a voltage signal for acquiring by the acquisition system 11. Wherein, the reference arm optical fiber 6 can be designed to be equal in length to the measurement arm optical fiber 8, but in a state isolated from vibration, and the vibration sensed on the interfering optical path will cause a change in the light intensity after coherence. In order to avoid the back light from affecting the laser, it is necessary to install an isolator 3 in the optical path of the laser. The high frequency subsystem acquires the accumulation of all the vibration signals sensed along the distributed optical fiber, and taking into account the fact that the time difference between the two broken wire events occurrence in the PCCP water conveyance project is generally not shorter than 10 ms, and also combining with the main distribution range of the frequency of the broken wire signal, the high frequency subsystem adopts a frequency not less than 100 kHz to acquire the signal.

In a preferred way of the present embodiment, the low frequency subsystem belongs to a coherent detection type, and the low frequency subsystem is based on the interference principle of the backward relay scattering light, and the integration in the space at a certain moment of the phase of the backward relay scattering light at every interval distance in the optical fiber is taken as the response at that moment of the midpoint location of the distance, so as to get the vibration time course curves of the various spatial sample channels along the length of the pipe (the sample channel is the sample point), and the low frequency subsystem outputs the vibration time course curve of each channel in two ways: 1) optical fiber strain rate time course curve; 2) optical fiber strain time course curve. For PCCP broken wire monitoring, the spatial length represented by a single sample channel of the low frequency subsystem is not more than 5 m. The number of sample channels of the low frequency subsystem reaches 4000 under the condition of 20 km, just as an example, but not as a limitation.

Further, the low frequency subsystem comprises a narrow line width laser source 12, a fourth connecting optical fiber 13, a coupler 14, a fifth connecting optical fiber 15, a pulse generator 16, an acousto-optic modulator 17, a sixth connecting optical fiber 18, an Erbium-doped optical fiber amplifier (EDFA) 19, a seventh connecting optical fiber 20, a circulator 21, a sensing optical fiber 22, an eighth connection optical fiber 23, a 3 dB coupler 24, a photoelectric detector 25, and an acquisition system 26.

The laser light emitted from the narrow line width light source 12 is sequentially launched to the sensing optical fiber 22 through the fourth connection optical fiber 13, coupler 14, fifth connection optical fiber 15, acousto-optic modulator 17, sixth connection optical fiber 18, erbium-doped optical fiber amplifier 19, seventh connection optical fiber 20 and circulator 21, and at the same time, a part of the light is divided by the coupler 14 to be used as a reference light through the eighth connection optical fiber 23, and the reference light interferes with a backward relay scattering light in the sensing optical fiber 22 in the 3 dB coupler 24, and the interfered light intensity is detected by the photo detector 25 to sense vibration information on the sensing optical fiber, and the optical signal detected by the photo detector 25 is collected by the acquisition system 26. Wherein, the Erbium-doped optical fiber amplifier 19 is applied to amplify the laser light injected into the sensing optical fiber 24. The pulse generator 16 is used to connect the acousto-optic modulator 17, and the acousto-optic modulator 17 is used to modulate the continuous light emitted by the laser into a pulse signal.

Figures 1, 1A, 2:
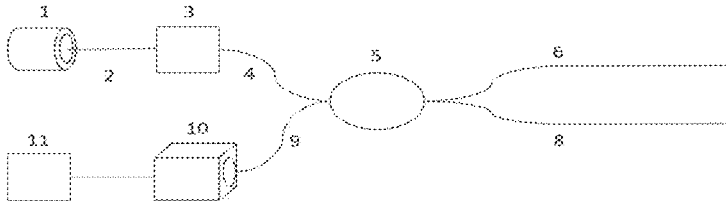
Figure 1B:
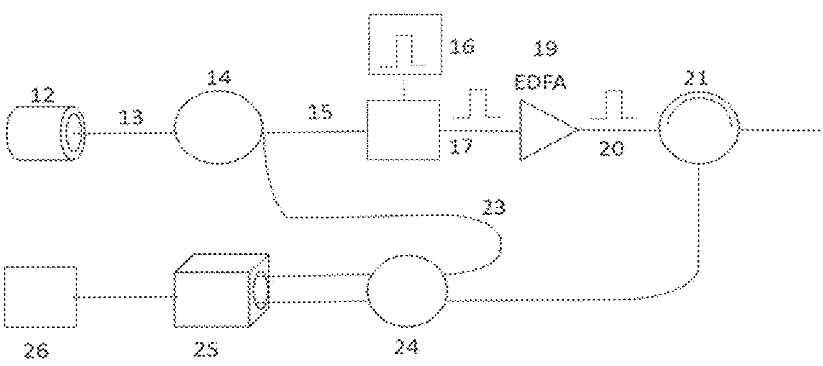
Figure 2:
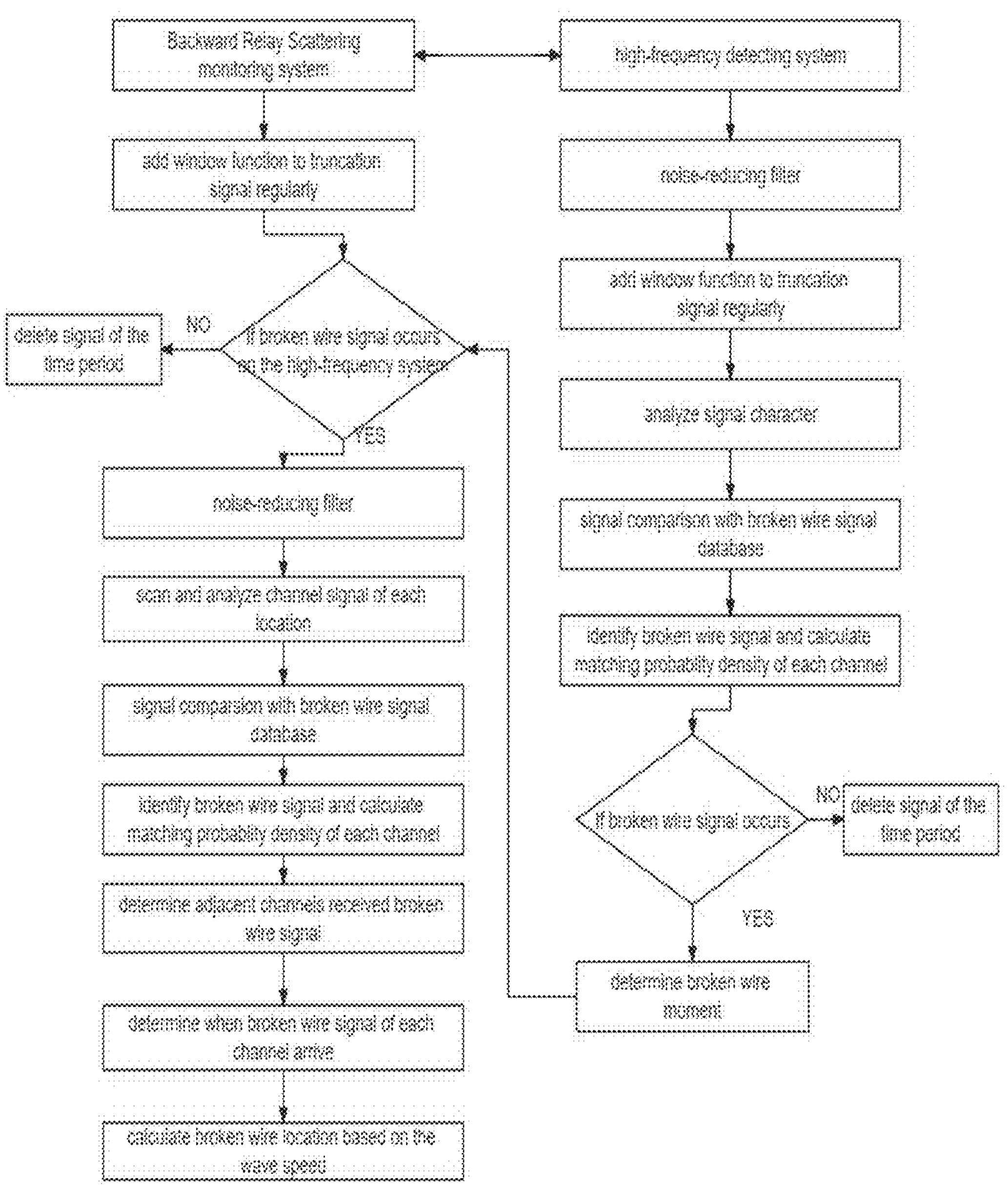

Embodiment 2: As shown in FIG. 2, this embodiment also provides a method of identifying and locating a PCCP broken wire signal, comprises:

S1, provide a distributed optical cable on a pipe by adhesive.

S2, acquire a broken wire vibration high frequency signal by the high frequency subsystem through the distributed optical fiber arranged inside the pipe based on Michelson optical fiber interference, and acquire a broken wire vibration low frequency signal by the low frequency subsystem through the distributed optical fiber based on backward relay scattering light interference;

S3, regularly adding window function to the truncated high frequency subsystem collect signal to perform abnormal vibration signal determination to determine whether a broken wire event occurs;

Specifically, the high frequency subsystem collect signal is window truncated in real time according to a certain time length, is filtered and time-frequency analyzed, to extract statistical characteristic parameters of time domain (including waveform indicators, pulse indicators, margin indicators, craggy indicators, peak-to-peak values, over-zero rate, rise time, fall time, cross-correlation function, etc.), frequency domain (including power spectrum, center of gravity frequency, root-mean-square frequency, frequency variance, spectral entropy, etc.) and time-frequency domain (including short-time power spectra, short-time power spectrum, short-time cross-correlation function, etc.), compare with a preset broken wire signal database, wherein the core of determining a broken wire event is to determine the proximity range of the sample signal to the known broken wire signal. A signal segment of the sample signal is input into an already trained classification model (such as proximity algorithm, artificial neural network method, etc.) for calculating the matching probability density of a segment of signal and the database, and when the probability density calculation result exceeds the preset threshold, the segment of signal may be automatically identified as a broken wire signal and the information of the time period of the abnormal signal occurrence may be sent to the low frequency subsystem, and if it is confirmed that it is not a broken wire signal, then the segment of signal is deleted.

In the embodiment, the regular adding window function truncate signal means: the high frequency subsystem and the low frequency subsystem continuously monitor and acquire vibration signals sensed by the distributed optical fiber, and during the process, the collected continuous vibration signal is truncated at a set fixed time. Wherein, the time window length should be longer than the duration time of the broken wire vibration signal, and the duration time of the high frequency and low frequency band signals should be taken into account; the time window length of the high frequency subsystem is not less than 15 ms, but the time should not be too long, to avoid identifying the two time-close broken wire events as a single one; the low frequency subsystem analyzes the broken wire signals only after the broken wire signal has been identified, which has certain lagging, and the low frequency band of the broken wire signals lasts for a long period, therefore, the window length should be increased appropriately.

Further, the filtering may be performed by FIR or IIR method.

Figure 3:
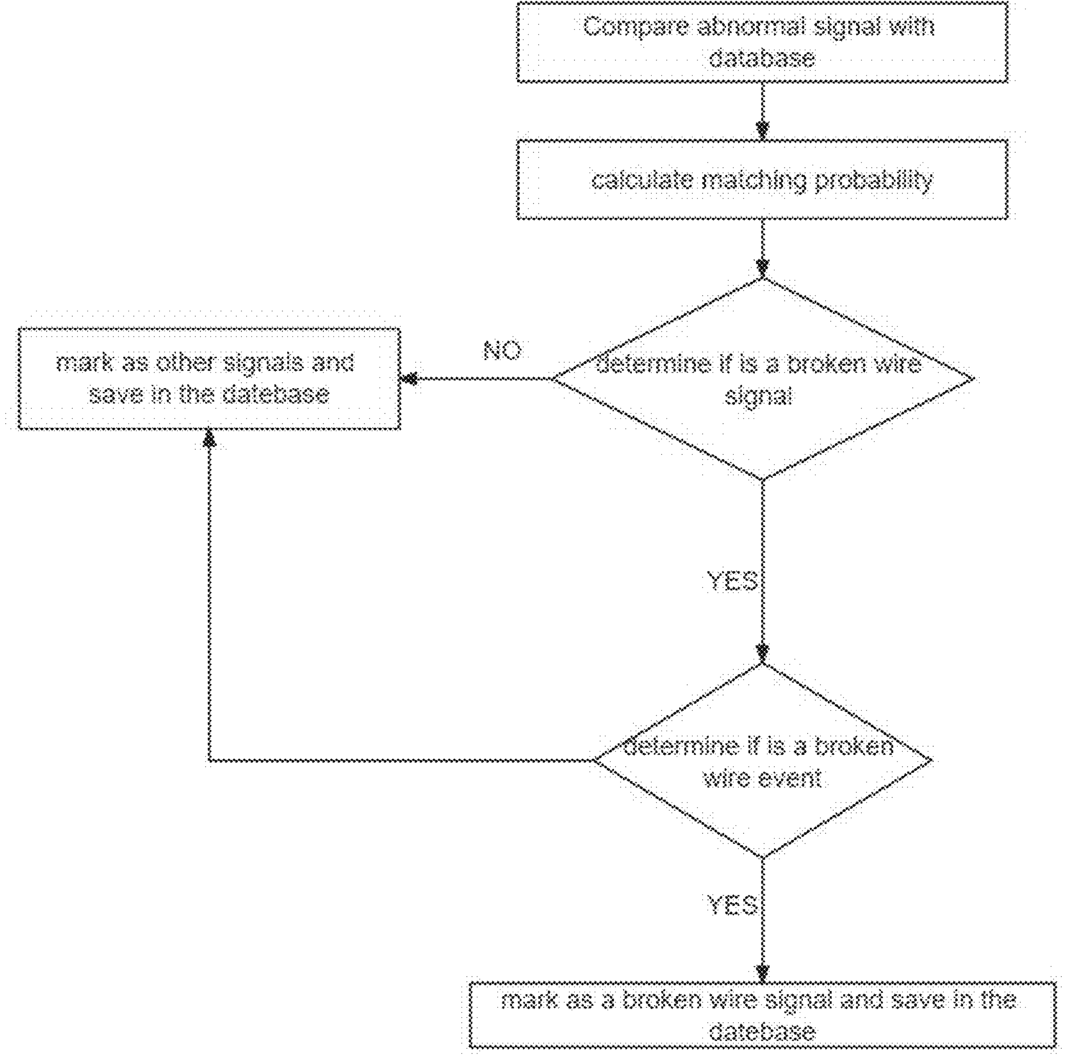
FIG. 3 shows a machine learning schematic diagram of an embodiment of the present invention.

Further, as shown in FIG. 3, a broken wire signal database is pre-established, and the broken wire signal database is a database of broken wire signals determined during long-term monitoring in the past, the content is continuously accumulated during the monitoring process, the actual verified broken wire signals and other non-broken wire signals can be marked differently in each case, and automatically saved into the broken wire signal database through continuous machine learning to complete the establishment of the broken wire signal database. The broken wire signal database includes all time course curves recorded by the high frequency subsystem that are identified as broken wires, and at the same time records the basic conditions at the time when each broken wire time course curve is collected, including the structural parameters of the pipe in which the broken wire occurs, the situation in which the section of the pipe and the upstream and downstream adjacent pipes have been determined to have a broken wire, as well as the flow rate in the pipe at the time when the broken wire occurs.

Further, a method of accumulating the broken wire signal database, comprises:

calculate a matching probability density of the sample signal and the broken wire signal database, and when a probability density calculation result is less than a preset threshold, mark the sample signal as other signal and save in the broken wire signal database;

When the probability density calculation result of the sample signal exceeds the preset threshold and a real broken wire event is verified, mark the sample signal as a broken wire signal and save in the broken wire signal database, otherwise mark the sample signal as other signal and save in the broken wire signal database.

S4, determine the time period of the abnormal vibration signal occurrence when the broken wire event is determined to occur.

S5, process the broken wire vibration low frequency signal corresponding to the time period of the abnormal vibration signal occurrence and determine the location of the broken wire signal occurrence according to fluctuation propagation law.

Specifically, the data is plus window truncated based on a time length same or similar to the one for processing the broken wire high frequency vibration signal; when the information of the abnormal vibration of the high frequency subsystem is known, then the data corresponding to time period of the abnormal vibration signal occurrence is saved for location, or else the data between a moment prior to this moment and the last abnormal signal occurrence moment is deleted; and the location process comprises: perform a filtering process on the broken wire low frequency data corresponding to the time period of the abnormal vibration signal occurrence, compare and analyze the data of each sample channel with a preset broken wire signal database, calculate the matching probability density of the signal data of each channel and the database, and when the probability density calculation result exceeds the preset threshold, the channel data is saved, and the other channel data is deleted; and then further analyze the location relationship of a number of the saved channels, and determine the adjacent 2-3 channels where the broken wire signal occurs according to the wave propagation law; and finally calculate the location where the broken wire signal occurs based on the wave speed.

Figure 4A:
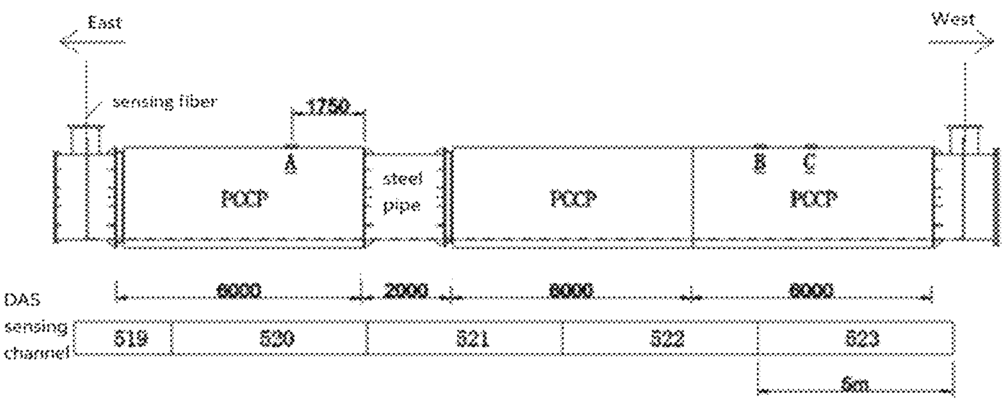
FIGS. 4A and 4B shows a schematic diagram of the location calculation principle of an embodiment of the present invention.
Figure 4B:
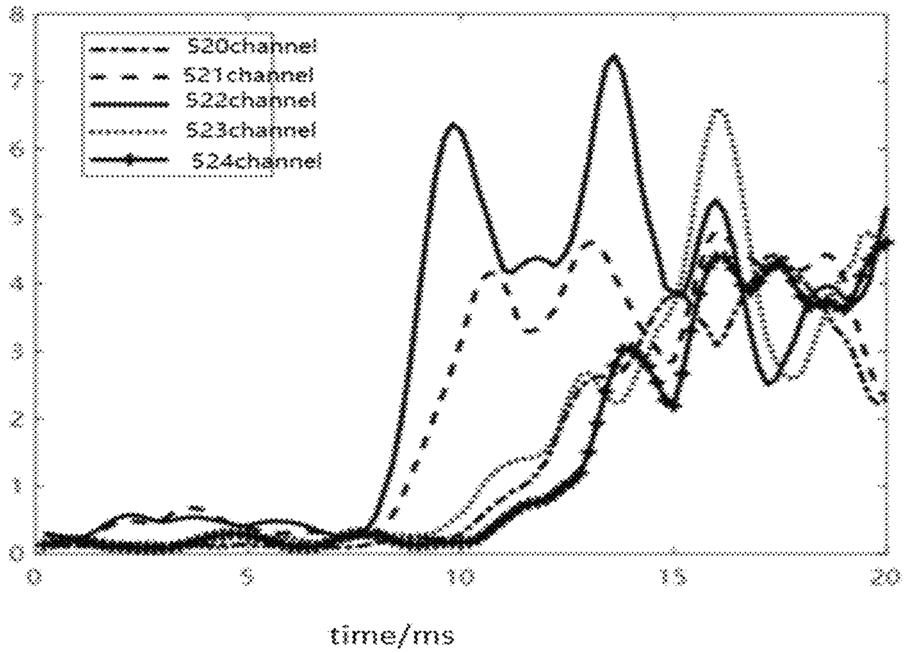

Further, the broken wire signal propagates from the location of broken wire occurrence to both sides of upstream and downstream of the pipe, and gradually decays during the propagation process. Scan each sample point signal of the low frequency subsystem, filter the water flow noise according to the operating conditions, screen out the signal with energy within a range which is concentration localized in space and time and have propagation attenuation characteristics, generally the range is 10 m~20 m. Calculate the time-frequency distribution of vibration signals of the sample points within the range, to judge the moment of the broken wire vibration signal arriving at the sample point. As shown in FIGS. 4A and 4B showing the calculation results of 520, 521, 522, 523 channels, it can be seen from the figure that the energy of each channel gradually rises since 9 ms, 521 channel rises most early and has the largest energy, followed by the 520 channel in the upstream side, and then the 522, 523 channel in the downstream side. The moment when the broken wire vibration signal arrives at each sample point is determined from the point of view of energy. The moment of arrival at each point can be set as a threshold based on the received abnormal vibration amplitude proportion (30%-100%) record by each channel, so as to determine the occurrence time, and after the signal exceeds the threshold, it is considered that the broken wire vibration signal arrives at that sample point. Select the first two adjacent sample points where the broken wire signal arrives at, if it is considered that the broken wire signal occurs between these two adjacent sample points, determine the time difference between the two moments when the broken wire signal arrives at these two adjacent sample points, and determine the location where the broken wire occurs according to the following equation:

$$x_1 = (d - vt)/2 \text{ or } x_2 = (d + vt)/2,$$

wherein x_1 is a distance from the broken wire location to a first sample channel, x_2 is a distance from the broken wire location to a second sample channel, tis a time difference between the two moments when the broken wire vibration low frequency signal arrives at the two adjacent sample channels, respectively; d is a space between the two adjacent sample channels; and v is a wave speed of the broken wire vibration low frequency signal propagating in the pipe. The range value is taken from 1000 m/s to 5000 m/s based on the different condition, that is, the acoustic optical fiber is affixed to the pipe wall, and whether there are other pipes made of non-PCCP materials at upstream and downstream of the broken wire occurrence location in the pipe.

The various embodiments in this specification are described in a progressive manner, the same similar parts between the various embodiments can be referred to each other, and each embodiment focuses on the differences with other embodiments. In the description of the present specification, the description with reference to the terms "an embodiment", "some implementations", etc. means that the specific features, structures, materials, or characteristics described in connection with the embodiment or example are included in at least one embodiment or example of the embodiments of the present specification. In the present specification, the schematic expressions of the above terms do not necessarily refer to the same embodiment or example. Moreover, the specific features, structures, materials, or characteristics described may be combined in a suitable manner in any one or more of the embodiments or examples. In addition, without contradicting each other, those skilled in the art may combine and combine different embodiments or examples and features of different embodiments or examples described in this specification.

Finally, it should be noted that the above embodiments are only used to illustrate the technical solution of the present invention, not to limit it; although the present invention has been described in detail with reference to the foregoing embodiments, the person of ordinary skill in the art should understand that he or she can still make modifications to the technical solution recorded in the foregoing embodiments, or make equivalent substitutions of some of the technical features therein; and such modifications or substitutions do not make the corresponding technical solution deviate from the essence of the present invention, and the technical solution may be modified. These modifications or substitutions do not cause the essence of the corresponding technical solutions to depart from the spirit and scope of the technical solutions of the embodiments of the present invention.

What is claimed is:

1. A device for identifying a prestressed concrete cylinder pipe broken wire signal, comprising:

a distributed optical cable, which adheres to a pipe longitudinally;

a high-frequency subsystem, which is connected to two cores of the distributed optical cable, the high-frequency subsystem is configured to collect a broken wire vibration high-frequency signal;

a low-frequency subsystem, which is connected to a third core of the distributed optical cable, the low-frequency subsystem is configured to detect a broken wire vibration low-frequency signal;

a control system which is connected to the high-frequency subsystem and the low-frequency subsystem, the control system is configured to analyze abnormal vibration on the broken wire vibration high-frequency signal and determine whether a broken wire event occurs, and, if the broken wire event is occurred, the control system is configured to determine a time period of an abnormal vibration signal occurrence corresponding to the broken wire event and then configured to determine the broken wire signal occurrence location based on a broken wire vibration low-frequency signal corresponding to the time period of the abnormal vibration signal occurrence;

wherein the high-frequency subsystem and the low-frequency subsystem collect signal synchronously.

2. The device according to claim 1, wherein the high frequency subsystem comprises a laser, a first coupler, and a first photoelectric detector;

an input of the first coupler comprises two interfaces, and an output of the first coupler comprises two interfaces;

the two cores of the distributed optical cable connected to the high-frequency subsystem comprises a reference arm optical fiber and a measurement arm optical fiber;

reflectors are provided at the ends of the reference arm optical fiber and measurement arm optical fiber;

an output of the laser and an input of the first photoelectric detector are connected to two interfaces of the input of the first coupler respectively;

a front end of the reference arm optical fiber and a front end of the measurement arm optical fiber are connected to two interfaces of the output of the first coupler respectively, and the reference arm optical fiber and the measurement arm optical fiber are both set on an inner wall of the pipe with their respective mirrors exposed;

a laser light emitted by the laser is transmitted into the first coupler and is divided into two parts of light within the first coupler, which are transmitted to the reference arm optical fiber and the measurement arm optical fiber, wherein the part of light transmitted to the reference arm optical fiber is a reference light, and the part of light transmitted to the measurement arm optical fiber is a measurement light, and the reference light and the measurement light require high-frequency signals vibrated in the pipe, and after are reflected by respective mirrors respectively, return to the first coupler, and interfere within the first coupler to form two beams of interference light, which are converted into voltage signals by the first photoelectric detector; and when the environmental vibration causes an optical path difference within the measurement arm optical fiber and the reference arm optical fiber, a phase change of the two beams of the interference light occurs.

3. The device according to claim 2, wherein the high frequency subsystem further comprises an isolator, an output of the laser is connected to an input of the isolator through a first connection optical fiber, and an output of the isolator is connected to an input of the first coupler through a second connection optical fiber, the laser light emitted by the laser is transmitted into the first coupler through the isolator.

4. The device according to claim 2, wherein the high frequency subsystem further comprises a first acquisition system, an input of the first acquisition system is connected to an output of the first photoelectric detector, the first acquisition system is used to collect a voltage signal of the first photoelectric detector.

5. The device according to claim 1, wherein the low-frequency subsystem comprises a laser, a second coupler, an acousto-optic modulator, a circulator, a third coupler, and a second photoelectric detector;

the third core of the distributed optical fiber is connected to the low-frequency subsystem and is used as a sensing optical fiber;

an input of the second coupler includes two interfaces, an output of the second coupler includes two interfaces;

an input of the third coupler includes two interfaces, an output of the third coupler includes two interfaces;

the circulator is a three-terminal circulator comprising a first port, a second port and a third port;

the output of the laser is connected to the interface of the input of the second coupler, one interface of the output of the second coupler is connected to the first port of the circulator through the acousto-optic modulator, and the second port of the circulator is connected to the sensing optical fiber;

the third port of the circulator and the other interface of the output of the second coupler are connected to two interfaces of the input of the third coupler respectively;

two interfaces of the input of the second photoelectric detector are connected to two interfaces of the output of the third coupler respectively;

a laser light emitted by the laser is transmitted into the second coupler and is divided into two parts of light, one part of which passes through the acousto-optic modulator and the circulator in turn and is transmitted into the sensing optical fiber; the other part of the light serves as a reference light and interferes with the light emitted from the third port of the circulator to form two beams of interference light in the third coupler, and the two beams of the interference light are converted into a voltage signal by the second photoelectric detector.

6. The device according to claim 5, wherein the acousto-optic modulator is provided with a pulse generator and the acousto-optic modulator is used to modulate continuous light emitted by the laser into a pulse signal.

7. The device according to claim 6, wherein the low frequency subsystem further comprises a second acquisition system, an input of said second acquisition system is connected to an output of the second photoelectric detector, and the second acquisition system is used to collect a voltage signal from the second photoelectric detector.

8. The device according to claim 6, wherein the low frequency subsystem further comprises an Erbium doped optical fiber amplifier, the Erbium doped optical fiber amplifier is provided between the acousto-optic modulator and the circulator, the output of the acousto-optic modulator is connected to a signal input of the Erbium doped optical fiber amplifier through a sixth connection optical fiber, and a signal output of the Erbium doped optical fiber amplifier is connected to the first port of the circulator.

9. The device according to claim 6, wherein the distributed optical fiber is adhered to an inner wall of the pipe or an outer wall of the pipe by gel material.

10. The device according to claim 9, wherein the distributed optical fiber extends out of the pipe by a special seal when the distributed optical fiber is adhered to the inner wall of the pipe; an outer surface of the gel material is coated with waterproof material to provide durability by surface protection.

11. A method of identifying a Prestressed Concrete Cylinder Pipe broken wire signal, comprising:

adhering a distributed optical cable on a pipe, two cores of the distributed optical cable is connected to a high-frequency subsystem for collecting a broken wire vibration high-frequency signal, and a third core of the distributed optical cable is connected to a low-frequency subsystem for collecting a broken wire vibration low-frequency signal;

analyzing abnormal vibration on the broken wire vibration high-frequency signal to determine whether a broken wire event occurs; and, if the broken wire event is occurred, firstly determining a time period of an abnormal vibration signal occurrence corresponding to the broken wire event and then determining the broken wire signal occurrence location based on a broken wire vibration low-frequency signal corresponding to the time period of the abnormal vibration signal occurrence.

12. The method according to claim 11, wherein before analyzing the abnormal vibration signal based on the broken wire vibration high-frequency signal, a broken wire signal database is pre-set, wherein the broken wire signal database is set with a threshold value;

determining whether the broken wire event occurs comprises:

firstly real-time plus-window truncating in accordance with the time period, then filtering, and analyzing time-frequency on the collected data of the broken wire vibration high-frequency signal, to extract characteristic parameters of time domain, frequency domain, and time-frequency domain of the broken wire vibration high-frequency signal; and comparing the extracted characteristic parameter with the broken wire signal database, if it exceeds the threshold value of the broken wire signal database, identifying the broken wire vibration high-frequency signal as a broken wire signal and determining that the broken wire event occurs.

13. The method according to claim 12, wherein content of the broken wire signal database is continuously accumulated in duration, an accumulating method comprises:

calculating a match probability density of the sampled broken wire vibration high-frequency signal or the sampled broken wire vibration low-frequency signal and the broken wire signal database, when the calculated match probability density is less than the threshold value of the broken wire signal database, marking as other signal and saving in the broken wire signal database; when the calculated match probability density exceeds the threshold value of the broken wire signal database, and a real broken wire event is verified, marking as a broken wire signal and saving in the broken wire signal database, otherwise marking as other signal and saving in the broken wire signal database.

14. The method according to claim 12, wherein determining the location where the broken wire signal occurs in according to the broken wire vibration low-frequency signal corresponding to the time period of the abnormal vibration signal occurrence, comprises:

plus-window truncating data in accordance with a time period which is same to or similar with that of the data of the broken wire high frequency vibration signal, and saving the data of the broken wire vibration low frequency signal corresponding to the time period in which the abnormal vibration signal occurs, in accordance with the time period corresponding to the abnormal vibration of broken wire vibration high frequency signal occurs;

filtering the date of the broken wire vibration low-frequency signal corresponding to the time period of abnormal vibration signal occurrence to obtain each sample channel data within the time period;

comparing each sample channel data within the time period and the broken wire signal database, if it exceeds the threshold value of the broken wire signal database, saving it, otherwise deleting it; and in accordance with the saved location relationship of several sample channels, determining adjacent channel of the broken wire signal occurrence and a broken wire occurrence location.

15. The method according to claim 14, wherein:

the broken wire occurrence location is determined according to the following equation:

$$x_1 = (d - vt)/2 \text{ or } x_2 = (d + vt)/2,$$

wherein $x_1$ is a distance from the broken wire location to a first sample channel, $x_2$ is a distance from the broken wire location to a second sample channel, t is a time difference between the two moments when the broken wire vibration low-frequency signal arrives at the two adjacent sample channels, respectively, d is a space between the two adjacent sample channels, and v is a wave speed of the broken wire vibration low-frequency signal propagating in the pipe.

* * * * *